United States Patent [19]

Makino et al.

[11] 4,356,160

[45] Oct. 26, 1982

[54] PROCESS FOR PRODUCING TITANIUM TRIHALIDES BY REDUCING TITANIUM TETRAHALIDES

[75] Inventors: Kenya Makino, Kuwana; Hieo Sakurai; Masaru Watanabe, both of Yokkaichi; Toshiyuki Nishimura, Kameyama, all of Japan

[73] Assignee: Japan EP Rubber Co., Ltd., Mie, Japan

[21] Appl. No.: 254,667

[22] Filed: Apr. 16, 1981

[30] Foreign Application Priority Data

Apr. 24, 1980 [JP] Japan .................................. 55-53555

[51] Int. Cl.$^3$ ............................................. C01G 23/02
[52] U.S. Cl. ............................... 423/492; 252/429 A; 252/429 C; 252/431 R; 252/441; 526/115; 526/142

[58] Field of Search .................... 423/492; 252/429 A, 252/429 C, 442, 431 R, 441; 526/115, 142

[56] References Cited

U.S. PATENT DOCUMENTS 3,640,987  2/1972  Phung et al. ..................... 423/492 X
3,891,746  6/1975  Laffitte ................................. 423/492
4,060,593 11/1977  Kazuo et al. ......................... 423/492

Primary Examiner—Earl C. Thomas
Attorney, Agent, or Firm—Wenderoth, Lind & Ponack

[57] ABSTRACT

In a process for producing a titanium trihalide by reducing a titanium tetrahalide with hydrogen, the improvement wherein the reduction is carried out in an organic solvent in the presence of an ether and at least one member of the group consisting of metals of Groups IB, IIB, IVB and VIII of the periodic table and compounds of these materials.

9 Claims, No Drawings

PROCESS FOR PRODUCING TITANIUM TRIHALIDES BY REDUCING TITANIUM TETRAHALIDES

This invention relates to a process for producing titanium trihalides by treating titanium tetrahalides with hydrogen.

Methods have heretofore been known to obtain solid titanium trichloride by reducing titanium tetrachloride with various reducing agents. Titanium trichloride obtained by reducing titanium tetrachloride with hydrogen is especially valuable because it does not contain appreciable amounts of impurities such as the metal used as a reducing agent. Conventional production of solid titanium trichloride by reducing titanium tetrachloride with hydrogen is effected, for example, by (1) a method which comprises contacting titanium tetrachloride with hydrogen at a high temperature of 800° C. under a high pressure, and (2) a method which comprises contacting titanium tetrachloride with hydrogen in silent discharge at a high voltage. These methods require a very large-scale apparatus, and are subject to great danger because they require high temperatures and high pressures or high voltages. Furthermore, according to these known methods, it is impossible to reduce titanium tetrachloride while it is maintained liquid.

It is an object of this invention to provide a process for producing titanium trihalides, which comprises reducing a titanium tetrahalide with hydrogen under mild conditions within short periods of time.

Another object of this invention is to provide a process for obtaining a liquid product containing titanium trichloride by reducing titanium tetrachloride with hydrogen.

The present inventors made extensive investigations in order to achieve the above objects, and found to their surprise that when a titanium tetrahalide is contacted with hydrogen in an organic solvent in the presence of an ether and at least one member selected from metals of Groups IB, IIB, IVB and VIII of the periodic table (described in "Handbook of Chemistry and Physics", 55th Edition) and compounds of these metals, a uniform liquid product containing a titanium trihalide is obtained within a very short period of time even under mild conditions involving room temperature and atmospheric pressure. In reducing the titanium tetrahalide at low temperatures and pressures with hydrogen, the presence of an ether and a metal of Group IB, IIB, IVB or VIII or a compound thereof is essential, and as will be shown in Comparative Examples given hereinbelow, lack of any one of these components causes failure of reduction of the titanium tetrahalide. The present invention has been achieved on the basis of such findings.

The present invention thus provides, in a process for producing a titanium trihalide by reducing a titanium tetrahalide with hydrogen, the improvement wherein the reduction is carried out in an organic solvent in the presence of an ether and at least one member selected from the group consisting of metals of Groups IB, IIB, IVB and VIII of the periodic table and compounds of these metals.

The liquid product containing titanium trihalide obtained by the process of this invention can be directly applied, in combination with an organometallic compound, as a catalyst for polymerization or copolymerization of olefins and conjugated dienes. It is most suitable as a catalyst for production of an olefin copolymer rubber having good processability, high tensile strength and a high degree of randomness by copolymerizing ethylene and propylene with or without a non-conjugated diene.

It is possible to precipitate a solid titanium compound from the resulting liquid product by the methods described hereinbelow. Alternatively, by adding a solid inorganic compound (to be described hereinbelow) insoluble in the organic solvent used and then precipitating a solid containing titanium trihalide, it is possible to precipitate a solid containing titanium trihalide on the surface of the solid inorganic compound. The solid catalyst component so obtained has a much higher surface area of titanium than a solid catalyst component precipitated without adding a solid inorganic compound, and polymerization or copolymerization of olefins using such a solid catalyst component can give high stereospecific polymers or copolymers with high activity. In other words, the liquid product containing titanium trihalide is very useful as an intermediate for preparing such a catalyst.

Examples of the titanium halide which can be used in this invention are titanium tetrachloride, titanium tetrabromide, titanium tetraiodide and mixtures of these.

The metals of Groups IB, IIB, IVB and VIII of the periodic table used in this invention include metals in solid form such as a powder or granular sponge, for example copper, silver, zinc, titanium, zirconium, iron, cobalt, nickel, ruthenium, rhodium, palladium, iridium and platinum; alloys of these metals; and powders, granules, particles, pellets, etc. obtained by supporting these metals on carbon, alumina, silica, etc. The compounds of these metals are, for example, chlorides, oxides, hydrides, sulfides, sulfates, nitrates, etc. of these metals. Specific examples include cuprous chloride, zirconium hydride, titanium hydride, ferrous chloride, cobalt chloride, nickel chloride, palladium chloride, platinum chloride, rhodium chloride, iridium chloride, ferrous oxide, palladium oxide, platinum oxide, palladium sulfide, platinum sulfide, palladium sulfate, platinum sulfate, cobalt nitrate, rhodium nitrate, palladium nitrate and platinum nitrate.

These metals or compounds may be used as a mixture of two or more. Preferred species of these metals or metal compounds are metals of Groups IB, IIB, IVB and VIII of the periodic table, compounds of metals of Group VIII, cuprous chloride, titanium hydride, and zirconium hydride. The metals of Group VIII and the compounds thereof are more preferred, and iron, cobalt, nickel, palladium, platinum, rhodium and iridium and their compounds are especially preferred. Palladium, platinum, and compounds of these are most preferred.

The ether used in this invention is represented by the general formula $R^1OR^2$ wherein $R_1$ and $R_2$ are identical or different and each represents an alkyl, alkenyl, aryl or aralkyl group having 1 to 20 carbon atoms, preferably 2 to 12 carbon atoms. Specific examples of the ether are given below.

(1) Dialkyl ethers

Diethyl ether, di-n-propyl ether, di-n-butyl ether, di-n-hexyl ether, di-n-octyl ether, di-n-decyl ether, di-n-dodecyl ether, hexyl octyl ether, and dicyclohexyl ether.

(2) Dialkenyl ethers bis(1-Octenyl) ether, bis(1-decenyl) ether, and 1-octenyl-9-decenyl ether.

(3) Diaralkyl ethers
bis(Benzyl) ether.
(4) Alkylalkenyl ethers
n-Octyl-1-decenyl ether, and n-decyl-1-decenyl ether.
(5) Alkylaralkyl ethers
n-Octylbenzyl ether and n-decylbenzyl ether.
(6) Aralkylalkenyl ethers
1-Octenylbenzyl ether.
(7) Alkylaryl ethers
Anisole.
(8) Diaryl ethers
Diphenyl ether.

These ethers may be used as a mixture of two or more. Preferred ethers are those of the above formula in which both $R^1$ and $R^2$ are alkyl groups.

Hydrogen of high purity is preferably used, although it can be used as a mixture with an inert gas such as nitrogen, argon and helium. The content of oxygen-containing compounds such as CO and $CO_2$ in the hydrogen is generally not more than 50 ppm, preferably not more than 20 ppm. A mixture of hydrogen with a small amount of an olefin can also be used.

Hydrocarbons or halogenated hydrocarbons may be used as the organic solvent in this invention. Most suitably, the hydrocarbons are saturated aliphatic hydrocarbons having 5 to 20 carbon atoms, preferably 5 to 10 carbon atoms, such as n-pentane, n-hexane, n-heptane, n-octane, n-decane, kerosene and liquid paraffin. Saturated alicyclic hydrocarbons having 5 to 12 carbon atoms, preferably 6 to 12 carbon atoms, such as cyclohexane and methylcyclohexane, and aromatic hydrocarbons having 6 to 9 carbon atoms, preferably 6 to 8 carbon atoms, such as benzene and toluene can also be used. Examples of the halogenated hydrocarbons include halogenated saturated aliphatic hydrocarbons having 1 to 12 carbon atoms, preferably 1 to 6 carbon atoms, halogenated saturated alicyclic hydrocarbons having 5 to 12 carbon atoms, preferably 6 to 8 carbon atoms, and halogenated aromatic hydrocarbons having 6 to 9 carbon atoms, preferably 6 to 8 carbon atoms. Specific examples of the halogenated saturated aliphatic hydrocarbons are methylene chloride, chloroform, carbon tetrachloride, monochloroethane, ethyl iodide, 1,2-dichloroethane, 1,1-dichloroethane, 1,1,2-trichloroethane, 1,1,2,2-tetrachloroethane, n-butyl chloride, and n-butyl iodide. Chlorocyclohexane is a specific example of the halogenated saturated alicyclic hydrocarbon, and specific examples of the halogenated aromatic hydrocarbons are chlorobenzene, bromobenzene, iodobenzene and ortho-dichlorobenzene.

Of these halogenated hydrocarbons, halogenated products of saturated aliphatic hydrocarbons having 1 to 12 carbon atoms, preferably 1 to 6 carbon atoms, are preferred. These hydrocarbon and halogenated hydrocarbon solvents may be used singly or as a mixture of two or more.

When hydrocarbons are used as the organic solvent, it is preferred to use ethers of the above formula in which $R^1$ and $R^2$ have 6 to 20 carbon atoms, preferably 6 to 12 carbon atoms.

The method of contacting a titanium tetrahalide with hydrogen in this invention is not particularly restricted. It may be effected by any known gas-liquid contacting methods, for example (1) a method which comprises adding the titanium tetrahalide, ether and solvent in the presence of the reducing catalyst (metal or its compound) and then blowing hydrogen into the mixture at atmospheric pressure; (2) a method which comprises feeding the reducing catalyst, titanium tetrahalide, ether and solvent to a pressure reactor, and then introducing hydrogen under pressure; and (3) a method which comprises countercurrently contacting the titanium tetrahalide, a solvent solution of the ether, and hydrogen in the presence of the reducing catalyst at atmospheric or elevated pressure. The contacting may be carried out either continuously or batchwise.

The pressure used in this invention is from atmospheric pressure to 100 kg/cm², preferably from atmospheric pressure to 50 kg/cm². The temperature is from $-50°$ C. to 200° C., preferably from $-30°$ C. to 150° C.

The mole ratio of the titanium tetrahalide to the ether used in this invention is generally from 1:0.1 to 1:50, preferably from 1:0.2 to 1:10, especially preferably from 1:0.5 to 1:5.

The metal of Groups IB, IIB, IVB or VIII of the periodic table or a compound thereof may be used in a catalytic amount, and use of it in a larger amount is economically disadvantageous. The suitable amount of the reducing catalyst is determined depending upon the type of the reducing method used, and upon whether the reduction is carried out continuously or batchwise. The mole ratio of the reducing catalyst to the titanium tetrahalide is generally from 0.00001 to 10 moles, preferably from 0.0001 to 1 mole, per mole of the titanium tetrahalide.

In treating the titanium tetrahalide with hydrogen in this invention, an organomagnesium compound and/or an organoaluminum compound may be used together.

Examples of the organomagnesium compound that may be used in this invention include dialkyl magnesiums such as diethyl magnesium and dibutyl magnesium; alkyl magnesium chlorides such as ethyl magnesium chloride, butyl magnesium chloride and octyl magnesium chloride; alkyl magnesium bromides such as ethyl magnesium bromide, butyl magnesium bromide and octyl magnesium bromide; alkyl magnesium iodides such as ethyl magnesium iodide, butyl magnesium iodide, octyl magnesium iodide and dodecyl magnesium iodide; alkyl magnesium alkoxides such as ethyl magnesium n-butoxide and n-butyl magnesium n-butoxide; dialkylaminoalkylmagnesiums such as diethylaminoethyl magnesium, diethylamino-n-butyl magnesium and di-n-butylamino-n-butyl magnesium; and alkylalkylthiomagnesiums such as ethyl-n-butylthiomagnesium and n-butyl-n-butylthiomagnesium. These organomagnesium compounds may be used as a mixture of two or more. The alkyl magnesium iodides and alkyl magnesium alkoxides are especially preferred among these compounds.

Examples of the organoaluminum compound used in this invention include trialkyl aluminums such as triethyl aluminum, tri-n-propyl aluminum, tri-i-propyl aluminum, tri-n-butyl aluminum, tri-i-butyl aluminum, tri-n-octyl aluminum and tri(2-methylpentyl)aluminum; dialkylaluminum hydrides such as diethylaluminum hydride and di-i-butyl-aluminum hydride; dialkylaluminum halides such as diethyl-aluminum chloride, diisobutylaluminum chloride and diethyl-aluminum bromide; alkylaluminum sesquihalides such as ethylaluminum sesquichloride and isobutylaluminum sesquichloride; alkylaluminum dihalides such as ethylaluminum dichloride and i-butylaluminum dichloride; and dialkyl-aluminum alkoxides such as diethylaluminum ethoxide. These organoaluminum compounds may be used as a mixture of two or more. Of these organoaluminum compounds, the trialkyl aluminums are preferred.

The organomagnesium compound and/or the organoaluminum compound may be added in the following manner.

(1) The organomagnesium compound and/or the organoaluminum compound is added to the titanium tetrahalide, and then reduction with hydrogen is carried out by the method described hereinabove.

(2) The organomagnesium compound and/or the organoaluminum compound is added during the reduction of the titanium tetrahalide with hydrogen by the method described hereinabove.

(3) The organomagnesium compound and/or the organoaluminum compound is added after the titanium tetrahalide has been reduced with hydrogen by the method described hereinabove.

The methods (1) and (2) are preferred.

The amount of the organomagnesium compound and/or the organoaluminum compound is 0.05 to 0.9 mole, preferably 0.1 to 0.75 mole, per mole of the titanium compound. When both of the organomagnesium compound and the organoaluminum compounds are used together, the total amount of these is within the above-specified range.

The liquid product obtained by this invention containing the titanium trihalide may be used for catalyst preparation even though it contains the metal of Group IB, IIB, IVB or VIII of the periodic table or a compound thereof. Preferably, it is used after separating such a metal or metal compound. For example, when the metal of Group IB, IIB, IVB or VIII or its compound is a solid and insoluble in a solvent, it can be easily separated by filtration.

A solid titanium composition may be precipitated from the liquid product containing the titanium trihalide, for example by (1) adding a solvent incapable of dissolving the solid titanium composition to the liquid product, or (2) removing the ether and/or the solvent. At this time, a solid inorganic compound insoluble in the solvent used may be caused to be present. The solid titanium composition precipitated from the liquid product in the presence of the inorganic compound is highly active as a polymerization or copolymerization catalyst for olefins and gives highly stereospecific polymers or copolymers. Examples of such an inorganic compound are magnesium hydroxide, magnesium chloride, magnesium sulfate, magnesium oxide, hydrochloromagnesium, silica, and alumina. The amount of the inorganic compound used is 0.1 to 1000 g, preferably 0.3 to 100 g, per gram of the titanium trihalide. In order to increase the efficiency of supporting titanium, the inorganic compound may be pre-treated with an ester, ketone, alcohol, amine, phosphorus compound or sulfur compound by a method disclosed, for example, in Japanese Laid-Open Patent Publication No. 9342/1972.

The liquid product containing the titanium trihalide obtained by the process of this invention may be used as such in the polymerization or copolymerization of olefins together with an organoaluminum compound.

The organoaluminum compound used at this time may be the same organoaluminum compounds as exemplified hereinabove. These organoaluminum compounds may be used as a mixture of two or more. Trialkyl aluminums are the preferred organoaluminum compounds to be used in combination with the titanium trihalide composition. The amount of the organoaluminum compound is 0.2 to 200 moles, preferably 1 to 100 moles, most preferably 1 to 50 moles, per mole of the titanium compound.

The following examples illustrate the present invention more specifically.

EXAMPLE 1

(A) Production of a liquid product (catalyst component) containing a reduction product of titanium tetrachloride A 100 ml three-necked flask fully dried and purged with nitrogen was charged with 50 mg of dry powdery platinum black, 50 ml of 1,2-dichloroethane and 10 millimoles of titanium tetrachloride, and then with stirring, 20 millimoles of n-butyl ether was added over the course of 5 minutes. The flask was maintained at 20° C., and hydrogen was blown into the flask for 2 hours at a rate of 0.2 liter/min. A yellowish black solution formed. The solution was filtered under nitrogen to separate powdery platinum black. The filtrate was a uniform yellowish black solution.

Analysis of the yellowish black uniform solution by an oxidation-reduction titrating method showed that the ratio of reduction of titanium tetrachloride was nearly 100%.

(B) Copolymerization of ethylene and propylene

A 3-liter separable flask was fitted with a stirring impeller, a three-way cock, a gas blowing tube and a thermometer, and the inside of the flask was fully purged with nitrogen and dried. Two liters of n-hexane dried with molecular sieves was put into the flask. A gaseous mixture dried with molecular sieves of ethylene (4 liters/min.), propylene (6 liters/min.) and hydrogen (0.1 liter/min.) was passed for 10 minutes into the flask kept at 35° C. through the gas blowing tube, and then 7.0 millimoles of triisobutyl aluminum and 0.7 millimole, calculated as titanium, of the liquid catalyst component prepared in (A) above were added. While passing the starting gaseous mixture at the aforesaid flow rates, copolymerization of ethylene and propylene was started. The copolymerization was performed for 30 minutes while maintaining the temperature of the inside of the flask at 35° C. Methanol (50 ml) was added to the polymer solution to stop the copolymerization. During the copolymerization, the solution was homogeneous, and no precipitation of copolymer was noted. A small amount of an antioxidant and 1 liter of water were added to the solution, and the mixture was well stirred. It was then subjected to steam stripping to give a solid copolymer rubber. The yield of the copolymer was 62 g, and its propylene content was 31% by weight. Its Mooney viscosity (measured at 100° C. with a preheating time of 1 minute and a measuring time of 4 minutes) was 74. The properties of the green copolymer rubber were measured by methods substantially conforming to JIS (Japanese Industrial Standard) K-6301, and the results are shown below.

100% Modulus: 12 kg/cm$^2$
Tensile strength: 50 kg/cm$^2$
Elongation at break: 3,000%
Shore A hardness: 52

(C) Copolymerization of ethylene, propylene and 5-ethylidene-2-norbornene

The same copolymerization as in (B) above was performed except that over the course of 25 minutes from the start of the copolymerization to 35 minutes before its termination, a hexane solution of 5-ethylidene-2-norbornene was fed at a rate of 8 ml/min. (4 millimoles/min. as 5-ethylidene-2-norbornene). During the copolymerization, the solution was homogeneous, and no precipitation of the copolymer was noted during the polymerization. The yield of the copolymer was 55 g.

The properties of the resulting terpolymer were as follows:
Propylene content: 32% by weight
Iodine value: 18
$ML_{1+4}^{100°}$ C.: 73
100% Modulus: 13 kg/cm$^2$
Tensile strength: 63 kg/cm$^2$
Elongation at break: 3,060%
Shore A hardness: 53

Comparative Example 1

Titanium tetrachloride was treated with hydrogen in the same way as in Example 1 except that the powdery platinum black was not used. Reduction of titanium tetrachloride, however, did not proceed at all, and even after blowing hydrogen for 2 hours, the reaction system remained slightly yellow (the color resulting from the coordination of n-butyl ether with titanium tetrachloride). The results demonstrate that in order to reduce titanium tetrachloride with hydrogen at low temperatures and pressures, the metal or metal compound in accordance with this invention is essential.

Comparative Example 2

Titanium tetrachloride was treated with hydrogen in the same way as in Example 1 except that the n-butyl ether was not used. Reduction of titanium tetrachloride, however, did not proceed at all, and even after blowing hydrogen for 2 hours, the reaction system remained colorless. The results show that in order to reduce titanium tetrachloride with hydrogen at low temperatures and pressure, the ether in accordance with this invention is essential.

EXAMPLE 2

(A) Production of a liquid product (catalyst component) containing reduced titanium tetrachloride A 200 ml. flask fully dried and nitrogen-purged was charged with 100 mg of powdery platinum black, 100 ml of 1,2-dichloroethane and 50 millimoles of titanium tetrachloride, and then with stirring, 100 millimoles of diethyl ether was added over the course of 5 minutes. The flask was maintained at 20° C., and hydrogen gas was blown into the flask at a rate of 0.2 liter/min. for 2 hours. The reaction mixture was filtered under nitrogen to separate the powdery platinum black. The filtrate was a yellowish black solution.

(B) Production of a solid composition (catalyst component) containing reduced titanium A 100 ml. flask fully purged with nitrogen was charged with 20 ml of the liquid product obtained in (A) above, and 100 ml of n-hexane was added dropwise over 20 minutes to the solution with stirring to give a fine powdery reduced titanium solid composition. The solid composition was washed with 50 ml of n-hexane five times, and 50 ml of n-hexane was added to prepare an n-hexane suspension of the reduced solid.

(C) Polymerization of ethylene

A 300 ml four-necked flask was fitted with a stirring impeller, a three-way cock, a thermometer and a gas blowing tube, and the inside of the flask was fully dried and purged with nitrogen. Dry n-hexane (200 ml) was put into the flask, and the flask was maintained at 40° C. Ethylene was passed into the flask through the gas-blowing tube at a rate of 2 liters/min. for 10 minutes, and then 20 millimoles of triisobutyl aluminum and 2 millimoles, calculated as titanium, of the n-hexane suspension of the solid composition of reduced titanium prepared in (B) above were added. Ethylene was passed into the flask at the aforesaid rate, and its polymerization was started. While maintaining the temperature at 40° C., the polymerization was performed for 10 minutes. The polymerization proceeded while the polymerization system was in the state of slurry. Then, 10 ml of methanol was added to stop the polymerization. A small amount of an antioxidant and 100 ml of water were added, and the mixture was well stirred. It was then subjected to steam stripping to give polyethylene in an amount of 3.9 g. The yield of the product based on the catalyst was 244 g-PE/g-Ti/hr.

(D) Polymerization of propylene

The same procedure as in (C) above was repeated except that propylene was blown into the flask at a rate of 3 liters/min. instead of ethylene. The polymerization proceeded while the polymerization system was in the state of slurry. The yield of polypropylene was 2.2 g. The yield of the product based on the catalyst was 138 g-PP/g-Ti/hr.

EXAMPLE 3

(A) Production of a solid composition (catalyst component) of reduced titanium

One gram of anhydrous magnesium chloride pulverized by a vibratory mill was put into a 100 ml. flask fully purged with nitrogen. Then, 20 ml of the liquid product of reduced titanium produced in (A) of Example 2 was added, and with stirring, the mixture was maintained at 75° C. for 2 hours. After the mixture was cooled to room temperature, 50 ml of n-hexane was slowly added dropwise with stirring. The resulting solid was collected by filtration under nitrogen atmosphere, and washed with 500 ml of n-hexane five times. 50 ml of n-hexane was added to prepare an n-hexane suspension of the solid composition of reduced titanium.

(B) Polymerization of ethylene

Ethylene was polymerized in the same way as in Example 2, (C) using 2 millimoles, calculated as titanium, of the solid composition of reduced titanium prepared in (A) above instead of the titanium composition prepared in Example 2, (B). The polymerization proceeded while the polymerization system was in the state of slurry. The yield of polyethylene was 4.5 g, and the yield of the product based on the catalyst was 282 g-PE/g-Ti/hr.

(C) Polymerization of propylene

Propylene was polymerized in the same way as in Example 2, (D) using 2 millimoles, calculated as titanium, of the solid titanium composition prepared in (A) above. The polymerization proceeded while the polymerization system was in the state of slurry. The yield of polypropylene was 3.2 g. The yield of the product based on the catalyst was 200 g-PP/g-Ti/hr.

EXAMPLE 4

(A) Production of a solid composition (catalyst component) of reduced titanium One gram of a pulverization product obtained by pulverizing anhydrous magnesium chloride and n-butyl alcohol (mole ratio 1:0.2) by a vibratory mill was put into a 100 ml flask fully purged with nitrogen. Then, 20 ml of the liquid product containing reduced titanium produced in Example 2, (A) was added. With stirring, the mixture was maintained at 75° C. for 2 hours. It was then cooled to room temperature, and the resulting solid composition was separated by filtration. The solid composition was washed with 50 ml of n-hexane five times. A suspension of the solid composition was prepared by adding 50 ml of n-hexane. The amount of titanium metal was 0.052 g (Ti supporting ratio 5.2%) per gram of the solid composition.

(B) Polymerization of ethylene

Ethylene was polymerized in the same way as in Example 2, (C) using 0.2 millimoles, calculated as titanium, of the solid composition of reduced titanium prepared in (A) above and 2 millimoles of tri-i-butyl aluminum. The polymerization proceeded while the polymerization system was in the state of slurry. The yield of polyethylene was 3.3 g, and the yield of the product based on the catalyst was 2067 g-PE/g-Ti/hr.

(C) Polymerization of propylene

Propylene was polymerized in the same way as in Example 2, (D) using 0.2 millimole, calculated as titanium, of the solid titanium composition prepared in (A) above and 2 millimoles of tri-i-butyl aluminum. The polymerization proceeded while the polymerization system was in the state of slurry. The yield of polypropylene was 2.1 g, and the yield of the product based on the catalyst was 1320 g-PP/g-Ti/hr.

EXAMPLES 5 TO 14

(A) Production of a liquid product (catalyst component) containing reduced titanium tetrachloride The same procedure as in Example 1, (A) was repeated except that the conditions shown in Table 1 were used. In all Examples, a yellowish black homogeneous solution was obtained.

(B) Copolymerization of ethylene and propylene

Ethylene and propylene were copolymerized by operating in the same way as in Example 1, (B) using each of the catalytic liquid products obtained in (A) above. During the copolymerization, no precipitation of a copolymer was noted. The amounts of copolymers obtained and the propylene contents of the copolymers are summarized in Table 1.

TABLE 1

| | | | | | | | | Ethylene/propylene copolymer | |
|---|---|---|---|---|---|---|---|---|---|
| Example | $TiCl_4$ (m-moles) | Solvent (ml) | Catalyst | Amount (mg) | Ether | Amount (m-moles) | Amount of $H_2$ blown (1/min.) | yield (g) | Propylene content (wt. %) |
| 5 | 10 | 1,2-dichloroethane (50) | Palladium-on-carbon (5% Pd) | 100 | Di-n-butyl ether | 20 | 0.2 (2 hrs) | 64 | 35 |
| 6 | " | 1,2-dichloroethane (50) | Powdery palladium nitrate | 50 | Di-n-butyl ether | " | 0.2 (2 hrs) | 58 | 32 |
| 7 | " | 1,2-dichloroethane (50) | Powdery palladium oxide | " | Di-n-butyl ether | " | 0.2 (2 hrs) | 66 | 36 |
| 8 | " | 1,2-dichloroethane (50) | Powdery copper | 700 | Di-n-butyl | " | 0.2 (10 hrs) | 55 | 32 |
| 9 | " | 1,2-dichloroethane (50) | Powdery zinc | " | Di-n-butyl ether | " | 0.2 (10 hrs) | 58 | 34 |
| 10 | " | 1,2-dichloroethane (50) | Powdery titanium | " | Di-n-butyl ether | " | 0.2 (10 hrs) | 56 | 33 |
| 11 | " | 1,2-dichloroethane (50) | Platinum black | 50 | Di-n-octyl ether | " | 0.2 (2 hrs) | 60 | 31 |
| 12 | " | monochlorobenzene (50) | " | " | Di-n-butyl ether | " | 0.2 (2 hrs) | 57 | 33 |
| 13 | " | 1,2-dichloromethane (50) | " | " | Di-n-butyl ether | " | 0.2 (2 hrs) | 59 | 34 |
| 14 | " | n-hexane (50) | " | " | Di-n-octyl ether | 30 | 0.2 | 51 | 30 |

EXAMPLE 15

(A) Production of a liquid product (catalyst component) containing reduced titanium tetrachloride A 100 ml. stainless steel autoclave fully dried and purged with nitrogen was charged with 1 g of dry powdery Raney cobalt, 50 ml of 1,2-dichloroethane and 10 millimoles of titanium tetrachloride, and then with stirring, 20 millimoles of n-butyl ether was added over the course of 5 minutes. Then, hydrogen was introduced to a pressure of 8 kg/cm$^2$, and the reaction was carried out at 100° C. for 10 hours. After the reaction, the reaction mixture was filtered under nitrogen to separate powdery Raney cobalt. The filtrate was a homogeneous yellowish black solution.

(B) Copolymerization of ethylene and propylene

Ethylene and propylene were copolymerized in the same way as in Example 1, (B) using the liquid product obtained in (A) above. No precipitation of copolymer was noted during the copolymerization. The yield of the copolymer was 45 g, and the propylene content of the copolymer was 29% by weight.

EXAMPLE 16

(A) Production of a liquid product (catalyst component) containing reduced titanium tetrachloride A 100 ml. flask fully dried and purged with nitrogen was charged with 100 mg of palladium-on-carbon (Pd content 5%), 50 ml of 1,2-dichloroethane and 10 millimoles of titanium tetrachloride, and then with stirring, 2.8 ml of n-butyl ether was added over the course of 5 minutes. The flask was cooled to 0° C., and with stirring, an n-butyl ether solution of 3 millimoles of n-butyl magnesium iodide was added over the course of 10 minutes. At this time, the mole ratio of total n-butyl ether to titanium tetrachloride was 2.0. A brown solution was obtained. The flask was maintained at 20° C., and hydrogen was blown into the flask for 2 hours at a rate of 0.2 liter/min. The reaction mixture was filtered under nitrogen to separate the powdery palladium-on-carbon. A yellowish black homogeneous solution was obtained.

(B) Copolymerization of ethylene and propylene

Ethylene and propylene were copolymerized by operating in the same way as in Example 1, (B) using the catalytic liquid product obtained in (A) above. During the copolymerization, no precipitation of copolymer was noted. The yield of the copolymer was 120 g, and the propylene content of the copolymer was 39% by weight.

EXAMPLE 17

(A) Production of a liquid product (catalyst component) containing reduced titanium tetrachloride A 100 ml flask fully dried and purged with nitrogen was charged with 100 mg of powdery palladium-on-carbon (Pd content 5%), 50 ml of 1,2-dichloroethane and 10 millimoles of titanium tetrachloride, and with stirring, 20 millimoles of n-butyl ether was added over 5 minutes. The flask was cooled to 0° C., and with stirring, 3 ml of an n-hexane solution of triisobutyl aluminum (1 mole/liter) was added over 10 minutes. A brown solution was obtained. Then, the flask was maintained at 20° C., and hydrogen was blown into it at a rate of 0.2 liter/min. for 2 hours. The reaction mixture was filtered under nitrogen to separate the powdery palladium-on-carbon. A homogeneous yellowish black solution was obtained.

(B) Copolymerization of ethylene and propylene

Ethylene and propylene were copolymerized by operating in the same way as in Example 1, (B) using the catalytic liquid product obtained in (A) above. During the copolymerization, no precipitation of copolymer was noted. The yield of the copolymer was 66 g, and the propylene content of the copolymer was 35% by weight.

What we claim is:

1. In a process for producing a titanium trihalide by reducing a titanium tetrahalide with hydrogen, the improvement wherein the reduction is carried out in an organic solvent in the presence of an ether and at least one reducing catalyst selected from the group consisting of copper, zinc, titanium, cobalt, nickel, platinum, palladium and compounds of these metals.

2. The process of claim 1 wherein the organic solvent is a hydrocarbon or a halogenated hydrocarbon.

3. The process of claim 1 wherein the ether is a compound of the formula $$R^1OR^2$$

wherein $R^1$ and $R^2$ are identical or different, and each represents an alkyl, alkenyl, aryl or aralkyl group having 1 to 20 carbon atoms.

4. The process of claim 1 wherein the compounds of the metals are chlorides, oxides, hydrides, sulfides, sulfates or nitrates.

5. The process of claim 1 wherein the reduction is carried out in the further presence of an organomagnesium compound, organoaluminum compound, or both.

6. The process of claim 1 wherein the amount of the ether is 0.1 to 50 moles per mole of the titanium tetrahalide.

7. The process of claim 1 wherein the amount of the reducing catalyst is 0.00001 to 10 moles per mole of the titanium tetrahalide.

8. The process of claim 1 wherein the reduction is carried out at a temperature of from −50° C. to 200° C. and a pressure of from atmospheric pressure to 100 kg/cm$^2$.

9. The process of claim 1 wherein the reducing catalyst is at least one member selected from the group consisting of cobalt, nickel, palladium and platinum.

* * * * *